Patented Aug. 23, 1938

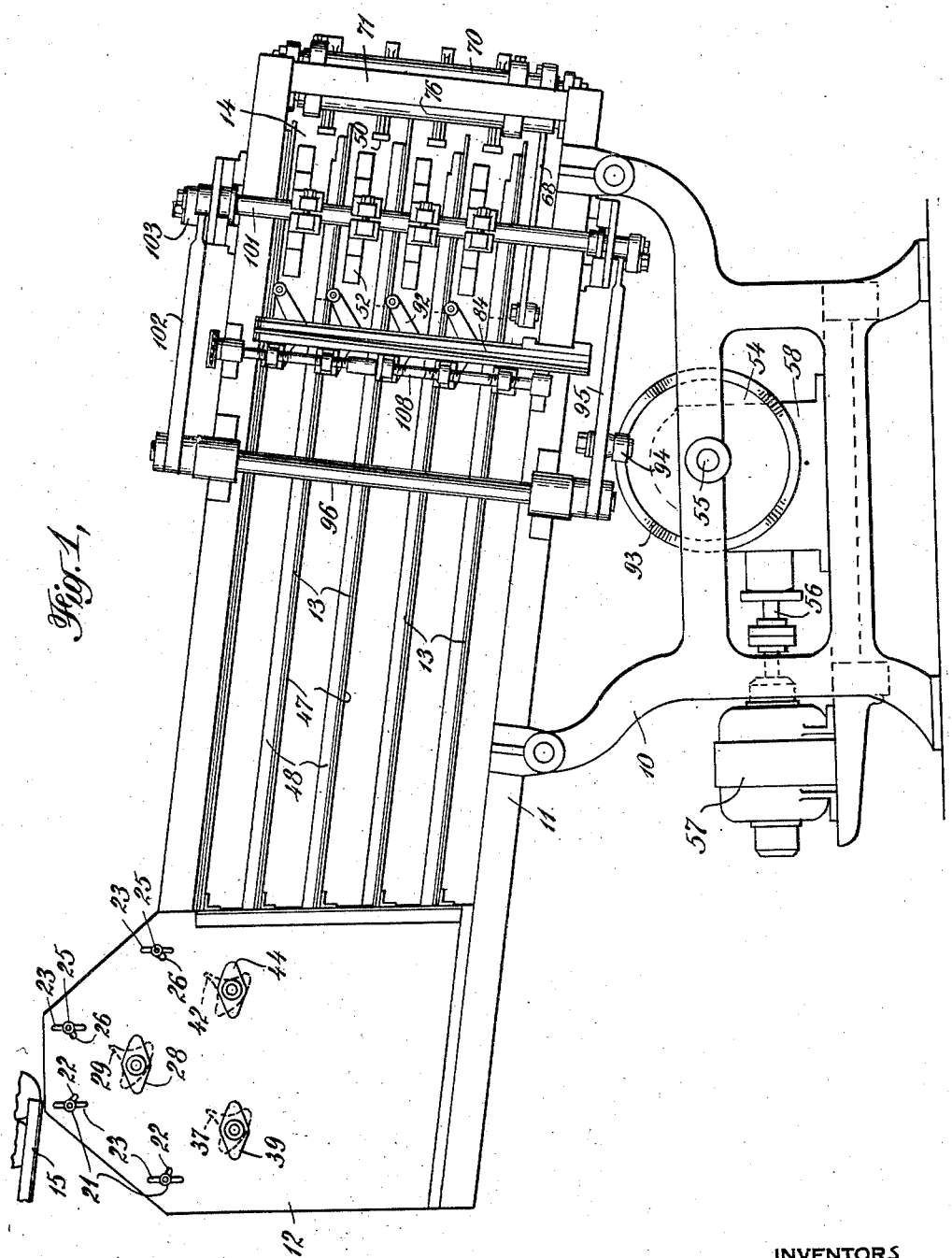

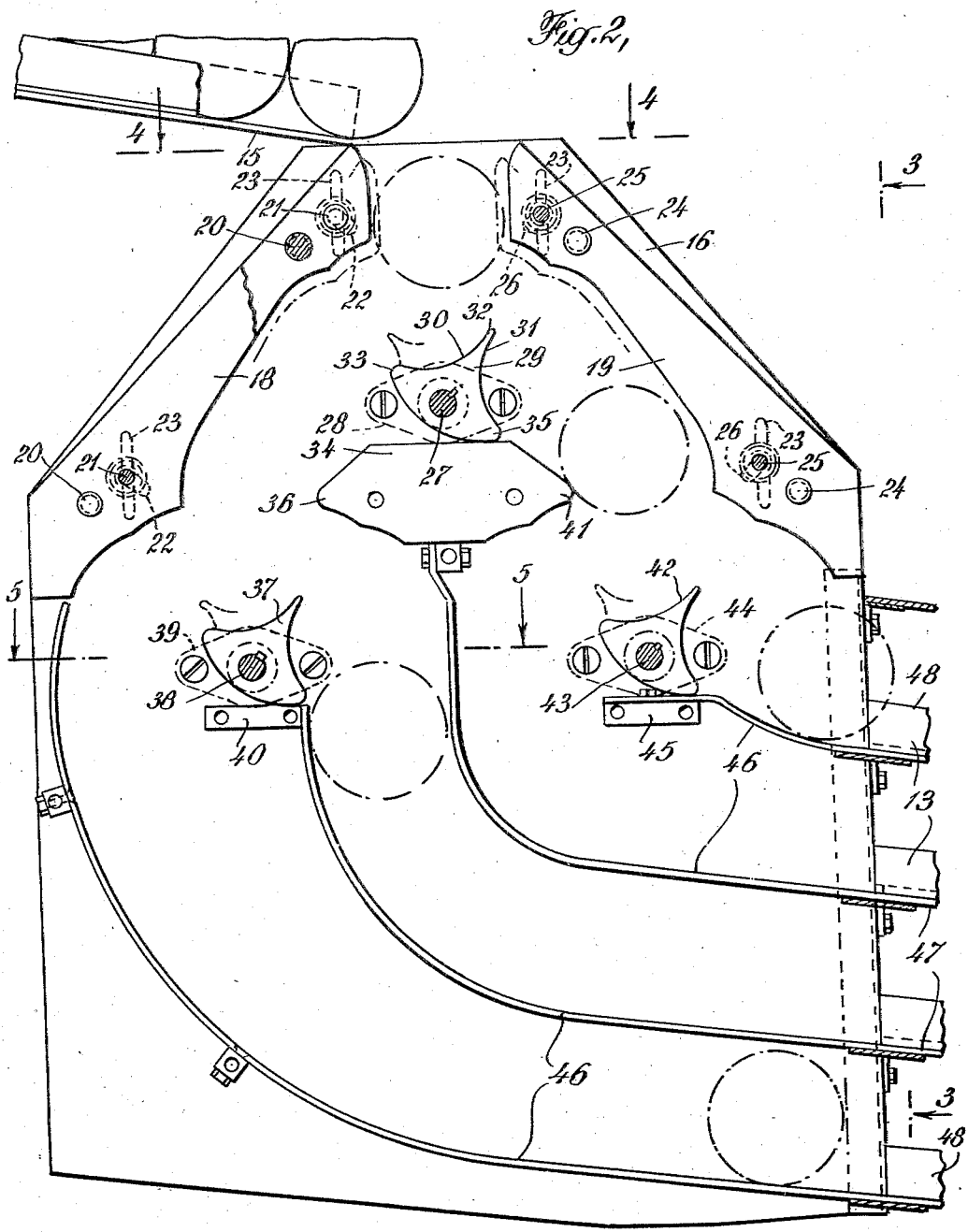

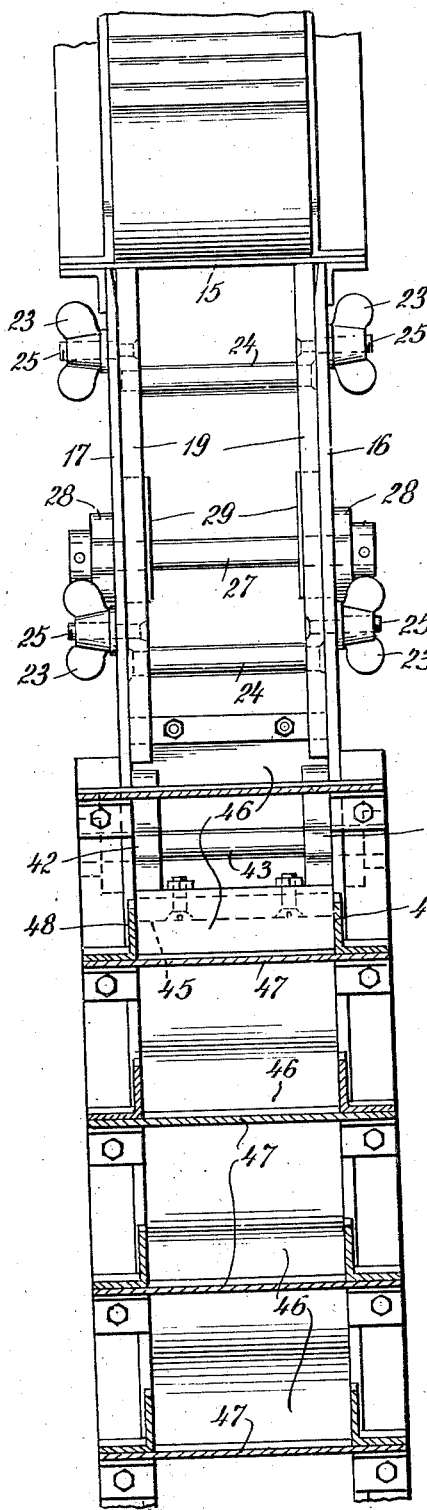
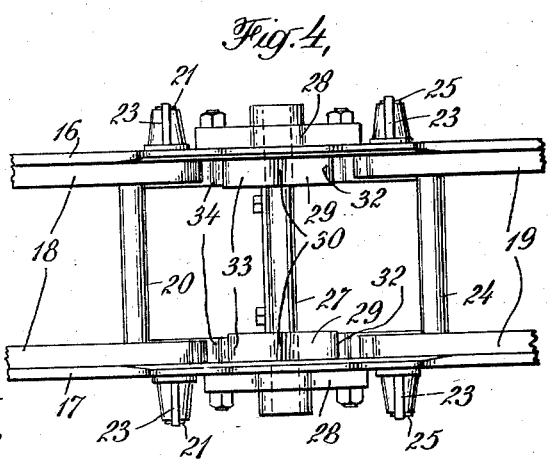
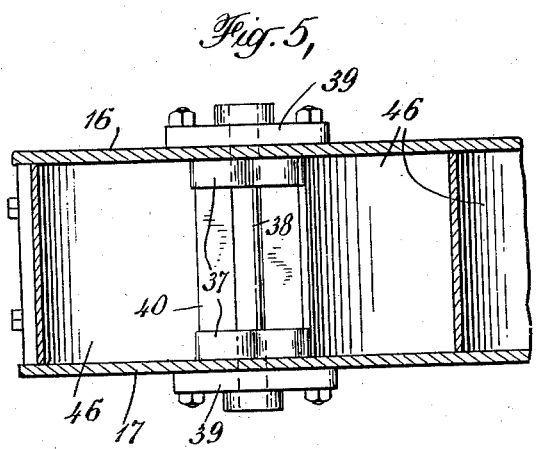

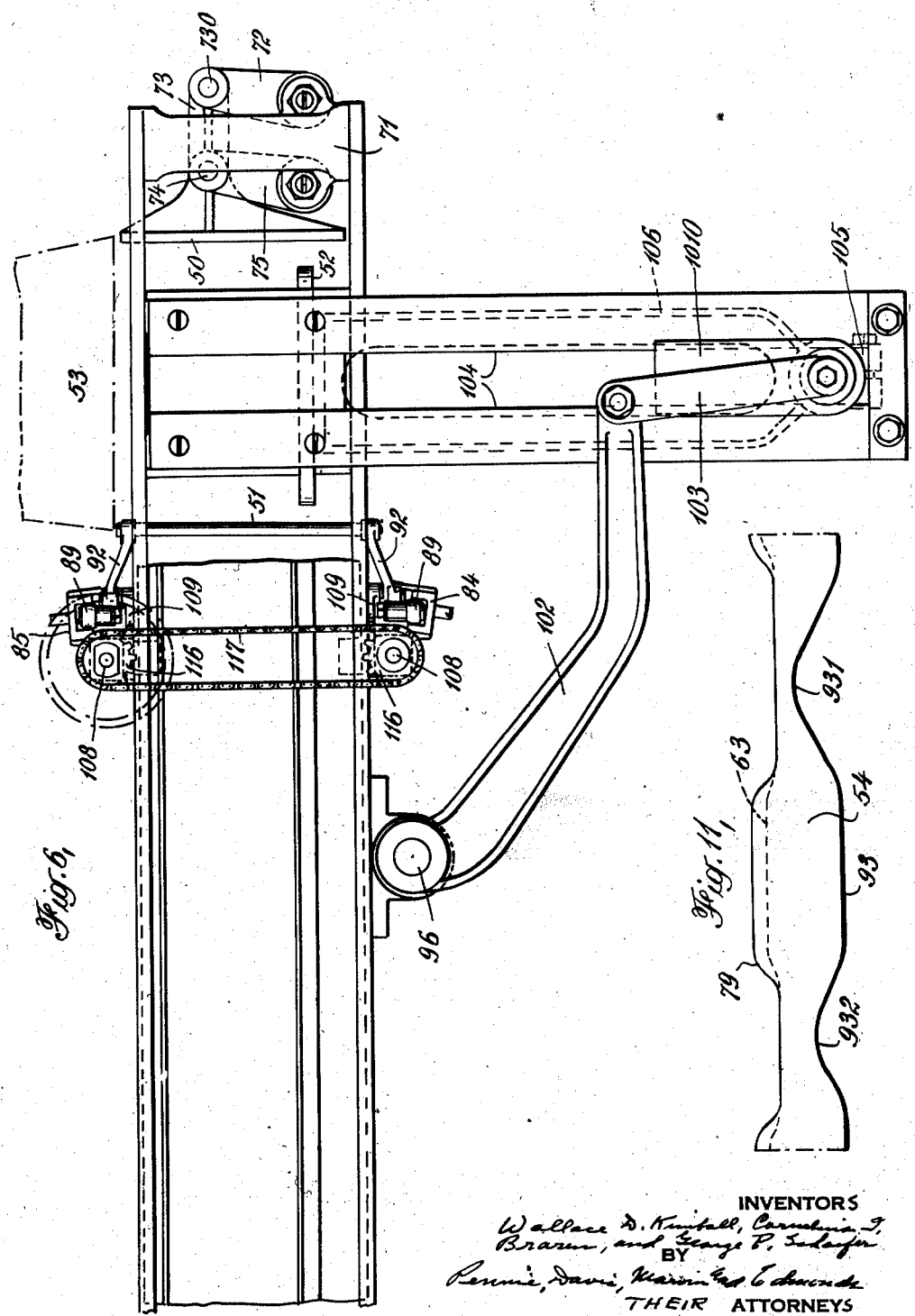

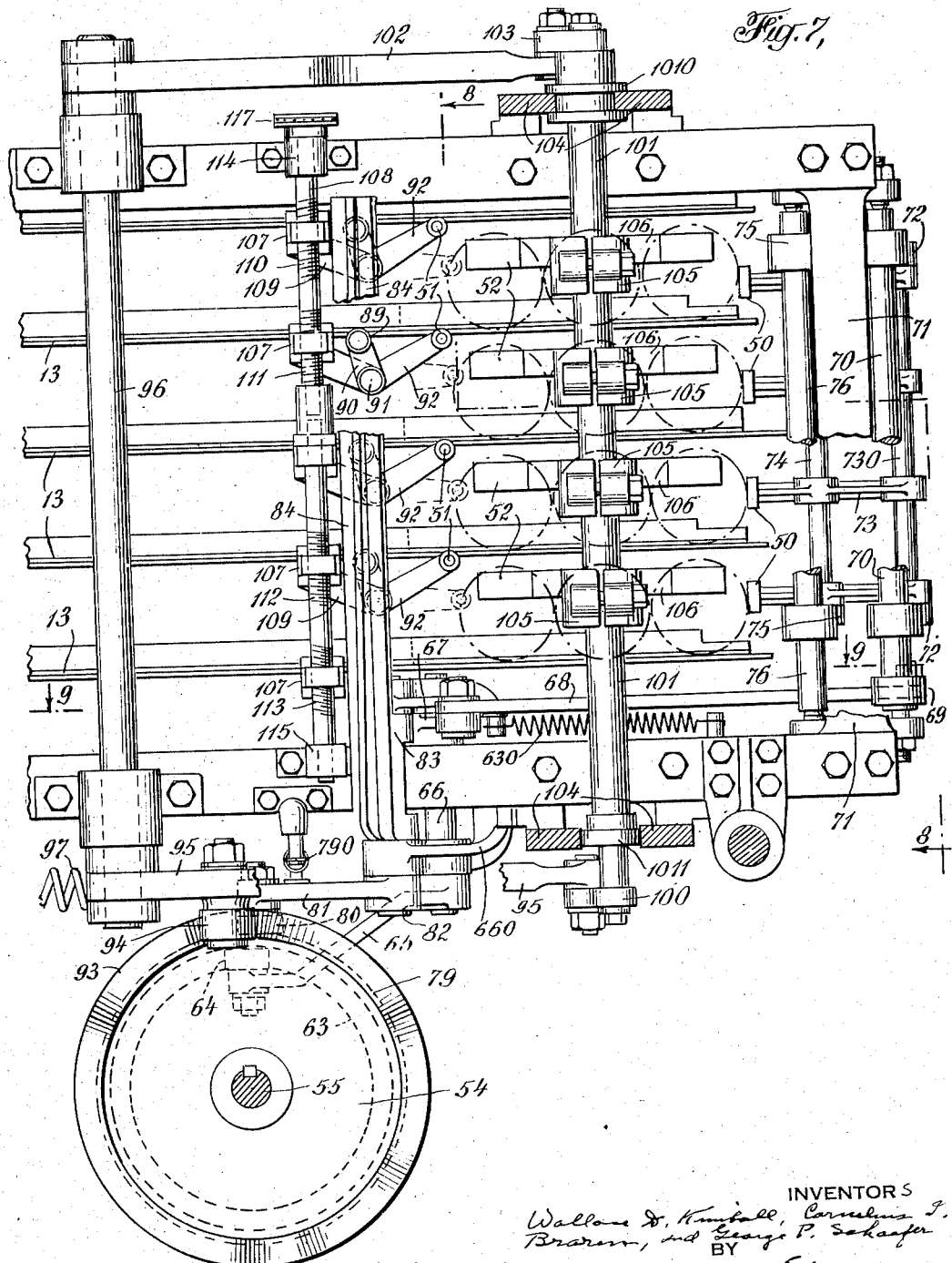

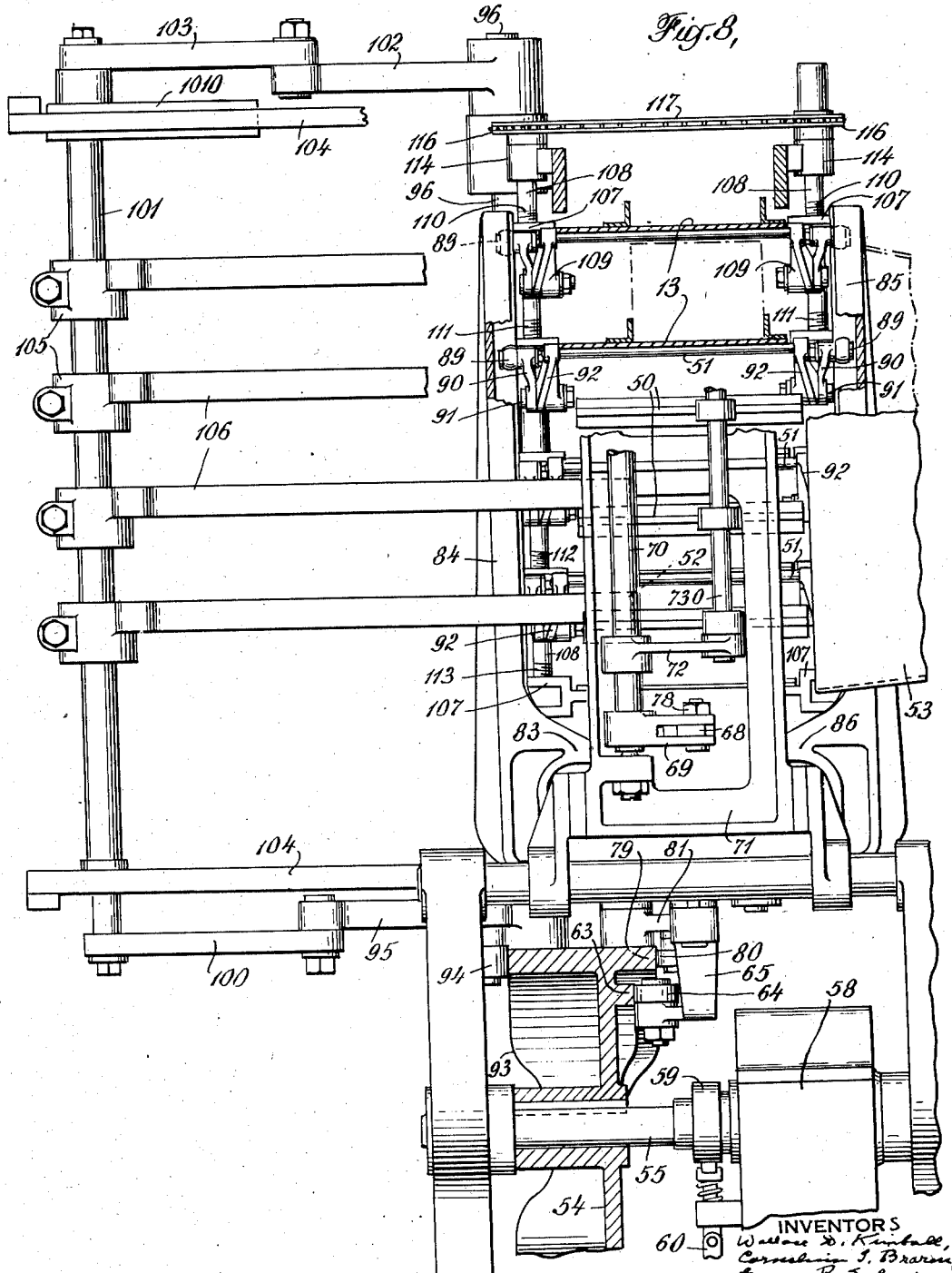

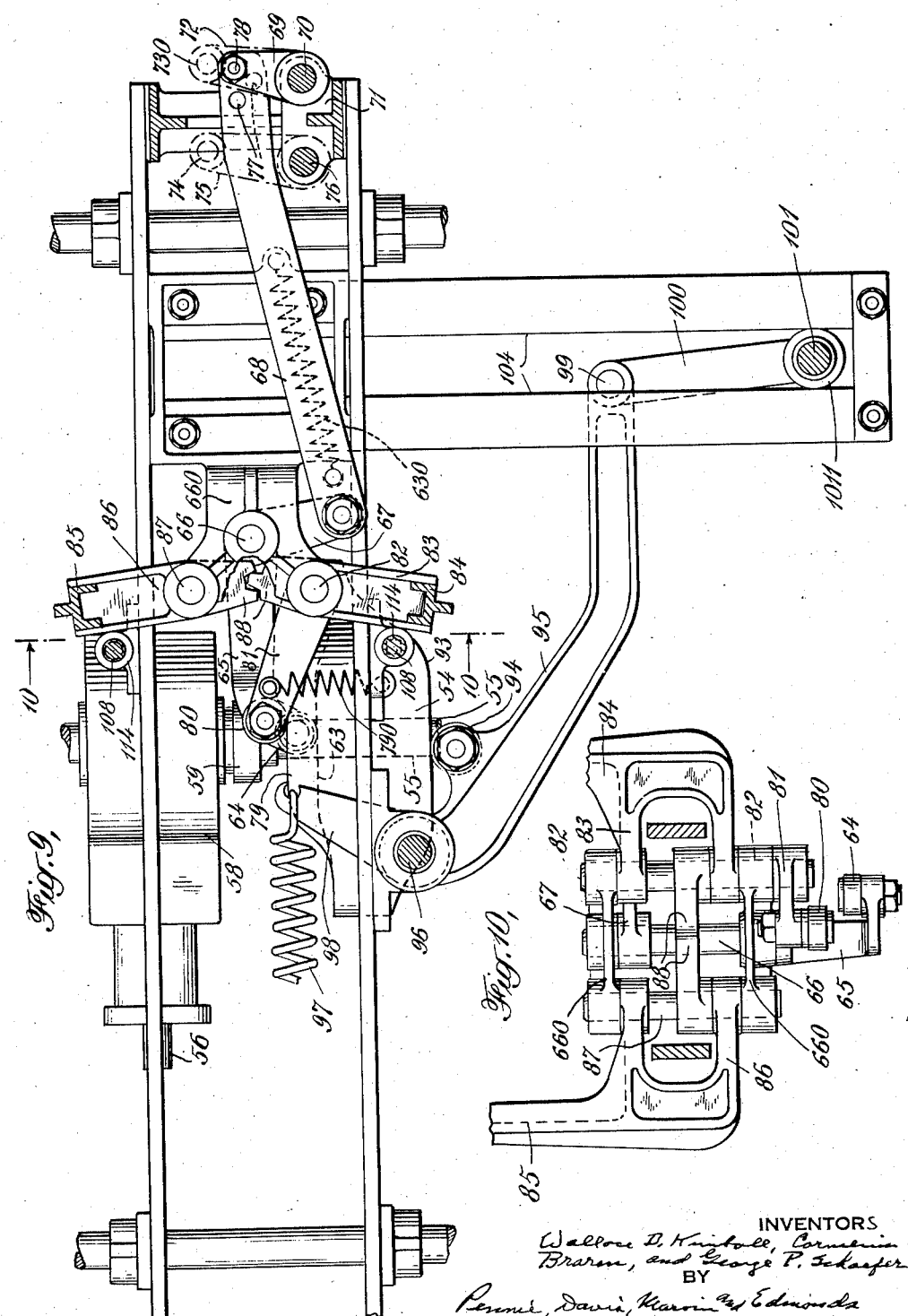

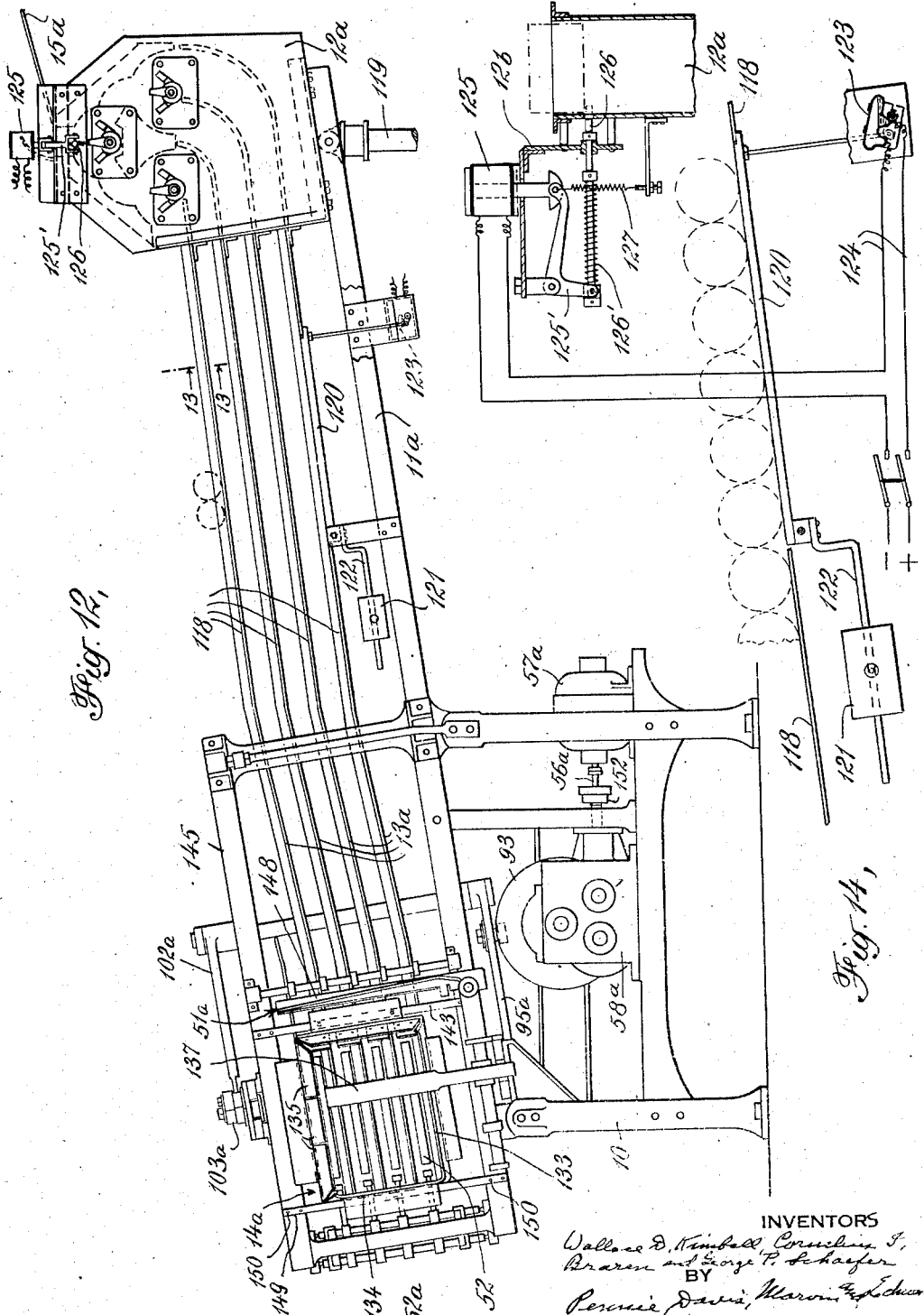

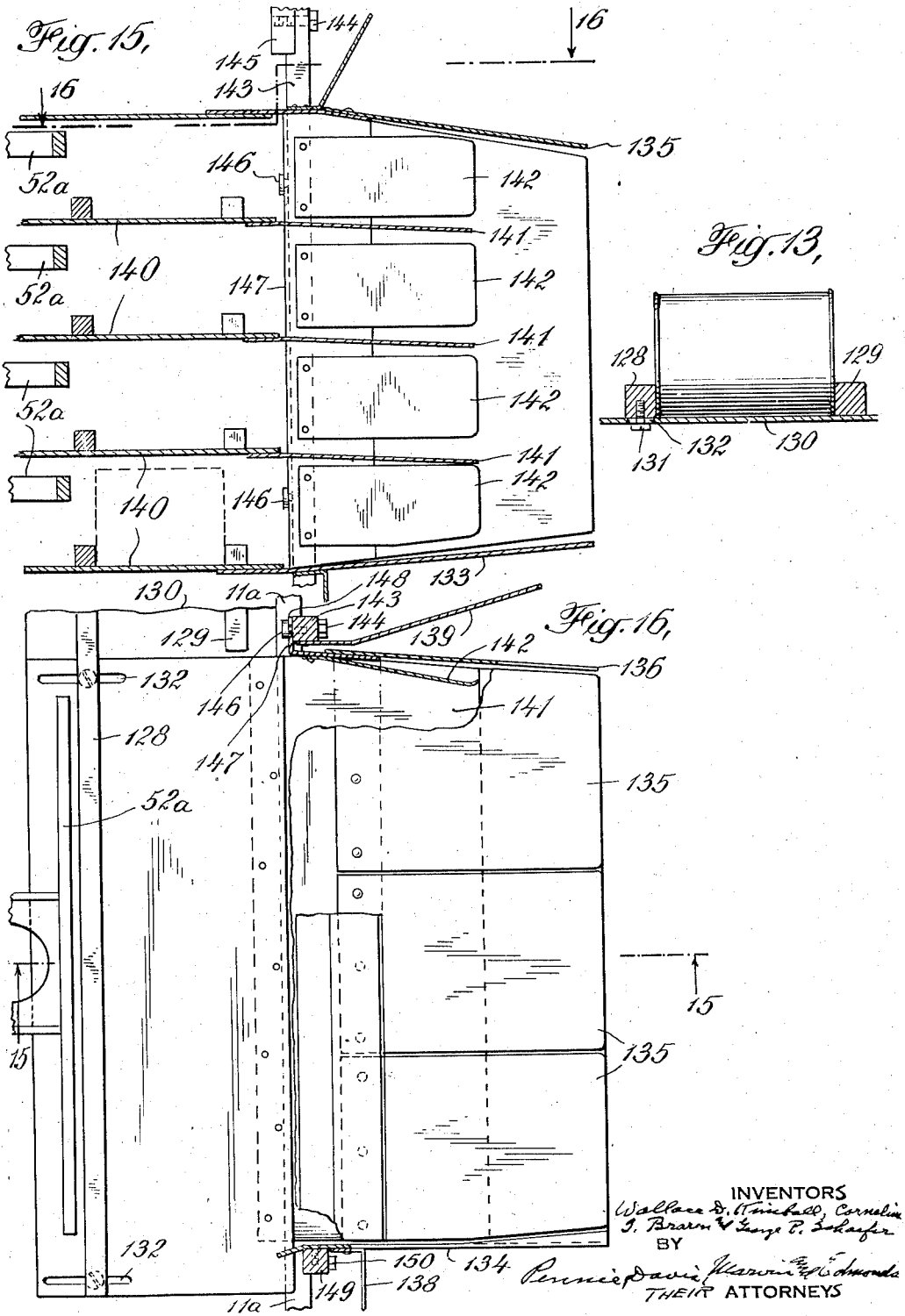

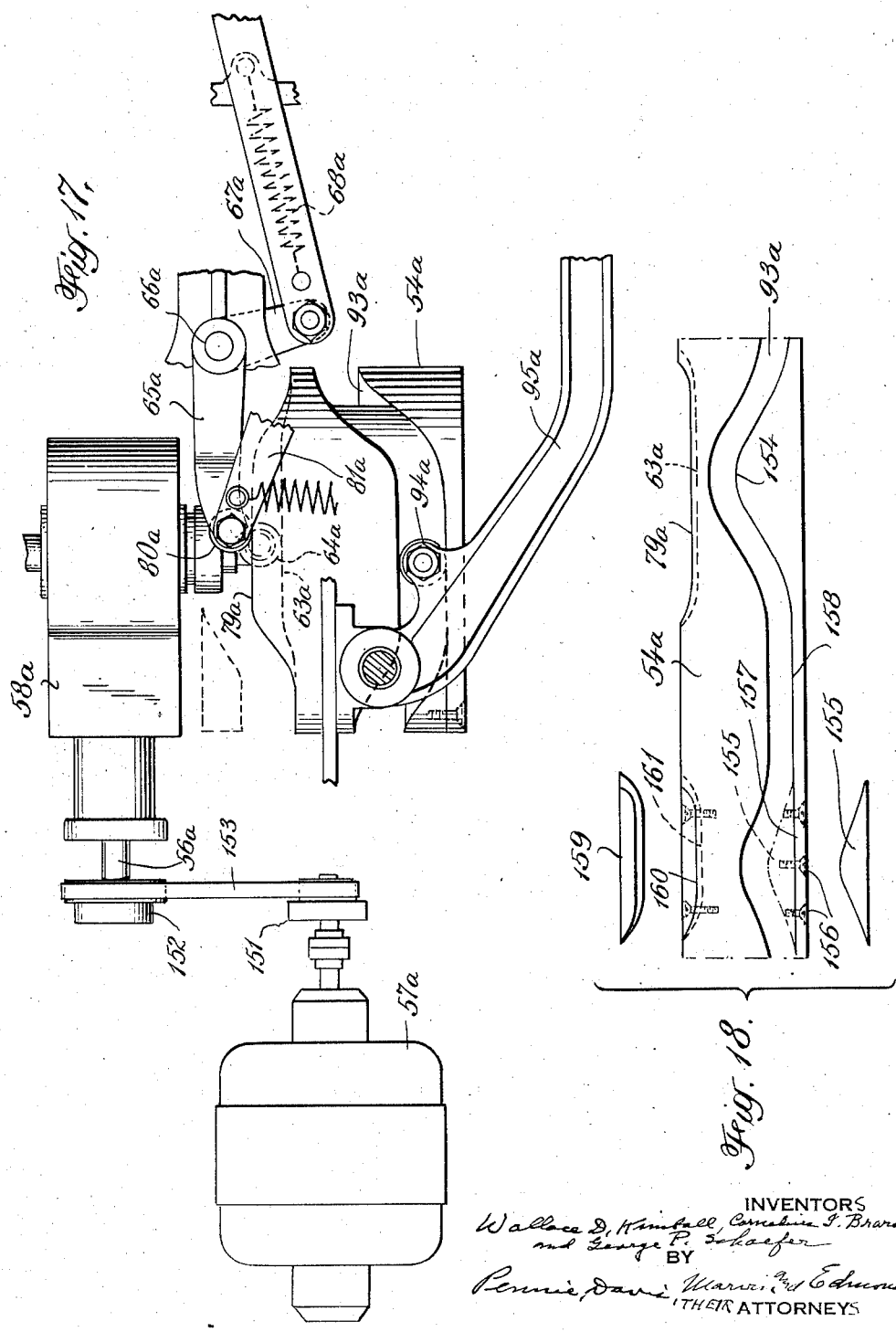

2,127,924

UNITED STATES PATENT OFFICE 2,127,924

CAN BOXING MACHINE

Wallace D. Kimball, Jackson Heights, Cornelius I. Braren, Jamaica, and George P. Schaefer, Bronx, N. Y., assignors to Standard-Knapp Corporation, Long Island City, N. Y., a corporation of New York Application August 17, 1936, Serial No. 96,496

19 Claims. (Cl. 226—15)

This invention relates to machines capable of stacking canned goods or the like in suitable superposed rows and then forcing the cans into boxes or cartons of suitable size to receive a definite number of cans.

Machines of this general character constructed heretofore have been so designed that a number of cans in excess of that required for a single row have had to be introduced into the machine, before the cans for the next row above or below could be supplied. For example, if it were desired to stack twelve cans in three rows of four cans each it would be necessary in the prior constructions to introduce a number of cans in excess of the twelve to be boxed in order to effect the desired stacking. Thus the first four cans of a batch fed into the machine would supply one of the rows, while the next group of between four and ten cans or more would not become a part of the stack then in the process of formation. The succeeding group of four cans would constitute a second row of the stack and there might be an additional group of cans entering the machine to fill up certain reserve storage spaces before the next series of four constituting the third row of the stack would be introduced. Thus the twelve cans, for example, which would be stacked for boxing would not be any twelve successive cans put into the machine but would be composed of groups of four cans separated by other groups of cans successively introduced into the machine. This is quite objectionable where the machine is used for the purpose of reboxing cans which have been stored away.

It is a common practice to store canned goods in unlabeled condition in cartons or boxes which are not sealed. When the goods are to be shipped for use they are passed through a labeling machine and then through a boxing machine again. Due to the different character of the goods stored in different lots it is highly desirable that the goods should be repacked in the same boxes or at least in the same order in which they were taken from the original boxes. This is not possible in the operation of can boxing machines heretofore known for the reasons already explained. Whenever a change in the character of the goods being boxed is met with it is necessary to remove the final cans of the preceding group and stack these by hand.

It has been an important object of the present invention to provide a can boxing machine which will stack the cans in the same order in which they are introduced into the machine. The arrangement is such, for example, that the first twelve cans put into the machine will be stacked in four rows of three cans each and introduced into the first box. Toward this end the machine includes the provision of means for separating or distributing the cans, as they are introduced, between a number of different channels corresponding with the rows to be formed. The means provided for this purpose is simple yet effective and completely reliable and is capable of performing its function at a speed greater than that at which the machine as a whole may be operated. This mechanism enables the efficient use of the machine in the reboxing of stored cans.

Another feature of the machine contemplated by the present invention is the provision of means permitting the use of the same distributing and stacking instrumentalities for the grouping of two stacks, of say twelve cans each, one in advance of the other and forcing these during one operation of the machine into a box of suitable dimensions. Heretofore in the boxing of cans in two layers or tiers it has been necessary to provide two separate stacking mechanisms placed side by side to form the two groups or stacks of cans or to operate the machine twice to separately introduce each layer into a box. The means provided in accordance with this invention for boxing two stacks of cans in a single operation is such that there is substantially no lost time due to the use of the same stacking devices and the operation is efficiently carried out.

Adjustability of the various portions of the machine to adapt it readily to the handling of cans of various diameters is another feature of the invention. The construction for this purpose is such that the opening through which the cans are introduced into the separating or distributing mechanism and the width of certain channels in this mechanism, may be varied to insure proper operation of this mechanism in the handling of different sized cans. Means are also provided for adjusting the runways which deliver the cans into the stacking chamber or portion of the machine and for adjusting certain detents and stops associated with this portion of the machine.

Other features and advantages of the construction contemplated by the present invention will appear from the detailed description of an illustrative form of the invention which will now be described in detail in conjunction with the accompanying drawings, in which:

Figure 1 is a side elevation of the complete machine.

Figure 2 is a vertical, longitudinal section taken through the separating or distributing portion of the machine.

Figure 3 is a transverse, sectional view taken along the line 3—3 of Figure 2.

Figure 4 is a horizontal, sectional view of a detail taken along the line 4—4 of Figure 2.

Figure 5 is a horizontal, sectional view taken along the line 5—5 of Figure 2.

Figure 6 is a plan view partly in section of the stacking chamber or portion of the machine disclosing the runways leading thereto.

Figure 7 is a side elevational view of the stacking portion of the machine with certain parts broken away, illustrating certain detents and stops, as well as the pushing devices used in forcing the cans into the boxes.

Figure 8 is a vertical, sectional view on line 8—8 of Fig. 7 showing the construction at the stacking and boxing end of the machine.

Figure 9 is a horizontal, sectional view taken along the line 9—9 of Figure 7.

Figure 10 is a sectional view disclosing a detail and is taken along the lines 10—10 of Figure 9.

Figure 11 is a diagram illustrating the development of certain cam faces.

Figure 12 illustrates a modification. It is a view similar to Figure 1, but from the opposite, or front, side of the machine.

Figure 13 is a section taken on line 13—13 of Figure 12.

Figure 14 is a view illustrating the operation of the can feed line cut off.

Figures 15 and 16 are views showing the construction of the funnel of the machine of Figure 12. Figure 15 is a vertical section taken on line 15—15 of Figure 16, and Figure 16 is a horizontal section taken on line 16—16 of Figure 15.

Figure 17 is a plan view of certain parts of the machine of Figure 6, these parts being of modified construction; and Figure 18 is a view showing the development of the modified form of cam shown in Figure 16.

Referring now to the drawings, the machine may comprise a suitable frame structure 10 adapted to support all of the various portions of the machine at a suitable height above the ground. This frame may be provided with upstanding arms having mounted thereon at an appropriate inclination to the horizontal a base or frame structure 11. At the high or left end of this structure, as shown in Figure 1, there is provided the distributing or separating mechanism designated generally by the reference character 12. Suitable inclined runways or tracks 13 leading from the discharge end of the distributing mechanism serve to convey the cans to the stacking chamber or portion of the machine, generally designated by the reference character 14. The cans to be stacked and boxed may be supplied to the machine in any suitable way, as by means of an inclined runway 15 above the distributing mechanism.

Figures 2 to 5 disclose the details of the construction of the separating or distributing mechanism. This mechanism may be suitably enclosed by a pair of side plates 16 and 17 which are joined by various cross rods and shafts, to be referred to hereinafter. Between these side plates, which are spaced a slightly greater distance than the normal height of the cans to be handled by the machine, are adjustably mounted pairs of guide elements 18 and 19. The guides 18, one of which is adjacent each of the side plates 16 and 17, may be joined and held suitably spaced by means of rods 20 riveted or otherwise secured to the guides. The spacing of the latter may be such as to place them in close proximity to the side plates or they may be separated slightly therefrom. In a machine intended to handle filled cans the guides are preferably held close to the side plates so that the heads of the cans will engage or roll upon the edges of the guides. On the other hand where the machine is intended to handle empty cans it is preferable to permit the bead at the bottom of the can to fit between the guide and the adjacent side plate.

Guides 18 may be adjustably supported by the side plates through the use of bolts or studs 21 riveted or otherwise secured to one of the guides and adapted to extend through elongated openings 22 in the side plate 16. A wing nut 23 may be provided for each of the bolts 21 and will serve to hold the two ends of the guides in any desired position of adjustment. One extreme position of the guides is shown in full lines in Figure 2 and the other extreme position is shown in dotted lines in this figure. In a similar way the pair of guides 19 may be joined by a pair of rods 24 and may be adjustably supported by studs or bolts 25 riveted or otherwise secured to one of the guides and adapted to pass through elongated openings 26 in the side plate 16. Wing nuts 23 may be provided on the bolts 25 for clamping the guides in any adjusted position between the full and dotted lines indicated in Figure 2.

By proper adjustment of the pairs of guides the opening at the top of the distributing mechanism as well as the channel formed in part by the guides may be varied to a suitable extent to accommodate cans of various diameters. The adjustment of the guides should be effected in such a way that the opening will at all times be substantially centrally disposed. This opening, furthermore, should be of such size as to permit the cans to drop freely through it but should not be so large that any considerable lateral movement of the can within the opening is permitted, since such a movement would be apt to cause a binding of the pair of cans between certain devices below the opening and the walls of the opening.

Directly beneath the opening provided between the guides 18 and 19 there is mounted a shaft 27 which may be suitably supported by a pair of bearing elements 28 secured in any suitable way to the outer sides of the plates 16 and 17. The shaft 27 may have keyed or splined thereto a pair of elements 29 in the form of a portion of a star wheel, one of these elements being placed adjacent each of the side frames 16 and 17 and being either in contact therewith or spaced slightly therefrom depending upon whether the machine is intended to handle filled or empty cans. The elements 29 are provided with a pair of curved surfaces 30 and 31 which are suitably inclined toward the point 32 of a star wheel construction. When the elements 29 are in the position shown in Figure 2, a can dropping through the opening between the guides 18 and 19 will strike the surfaces 30 and due to the slope of these surfaces and the relation of the center of gravity of the can with respect to the shaft 27, the members will be rocked about their pivots until the extensions 33 engage the upper surfaces of plates 34 secured to the side plates 16 and 17. As a result of this operation the can in question will be directed into the channel formed in part by the guides 18. The succeeding can passing through the opening between the guides 18 and 19 will then strike the curved surfaces 31 of the elements 29 and will cause these elements to be rocked in a clockwise direction until the projections 35 strike the upper surfaces of the plates 34, being then again in the position shown in full lines in Figure 2. In the course of this rocking movement of the elements 29 the second can will be directed toward the guide 19. The elements 29 thus provide a means for dividing or distributing the cans, fed continuously through the opening, alternately into channels at the left and the right of these elements.

The cans which are delivered to the left of the elements 29 slide over extensions 36 of the plates 34 and drop into contact with one or the other of a pair of curved surfaces on star wheel elements 37 which are similar in all respects to the elements 29. The elements 37 are carried by a shaft 38 mounted in bearing members 39 secured to the side plates. The action of the elements 37 is precisely the same as that of the elements 29, they being rocked about their pivots until their lateral wings or extensions engage plates or brackets 40 secured to the side plates. It will be apparent that through the provision of the elements 37 a further separation of the cans between two additional channels is provided. In a similar way a further separation of the cans directed toward the right of the elements 29 is effected. These cans roll over the ends 41 of plates 34 and drop into engagement with one or the other of the pairs of curved surfaces carried by star wheel elements 42. These elements are keyed to a shaft 43 suitably mounted in bearings 44 secured to the side plates. The rocking movements of the elements 42 are limited in each direction by engagement of lateral wings or extensions thereof with plates or brackets 45 secured to the side plates.

Suitable channels to receive the cans as they are distributed or divided between the four lanes to the left and right of the shafts 38 and 43, respectively, are formed by guide strips or plates 46 secured in any suitable way to the side plates of the mechanism. The guide strips 46 terminate directly in line with the inclined runways 13 and serve to deliver the cans to these runways. It will be clear that through the provision of the three sets of star wheel or divider elements 29, 37 and 42, in the manner explained, each successive group of four cans will be distributed between the four separate runways 13. As illustrated in Figure 3, these runways may comprise a bottom plate 47 and side angle members 48 having their vertical legs suitably spaced a slight distance greater than the height of the cans handled by the machine.

As the cans are discharged to the runways 13, they are fed by gravity to the lower or right hand end of the machine, as shown in Figure 1, which constitutes the stacking chamber and boxing portion of the machine. Here the cans are arrested by a series of stops 50, one of which is provided for each of the rows of cans. These stops, as will be presently explained, are only temporarily held in the position shown in Figure 1, and at the proper time are withdrawn to permit the cans to shift a slight distance further toward the end of the machine. At the same time a series of detents or divider bars 51, one related to each of the runways, will be rocked downwardly in synchronism with or preferably slightly in advance of the withdrawal of the stops 50 to engage the lowermost can on each runway and hold it back to produce a separation between the cans to be boxed and those remaining on the runways. This construction is for the purpose of avoiding the tearing of the labels on the cans, which would arise from the relative longitudinal movement between those being shifted and the adjacent stationary cans. At the appropriate time the cans which have been properly lined up for boxing are forced by means of a pusher 52 into a funnel 53 over or adjacent to which is placed the open end of the box or carton into which the cans are to be loaded.

The operating mechanism for causing the withdrawal of the stops 50, the operation of the detents 51 and the shifting of the pushers 52 will now be described. This mechanism, as will be pointed out, is so constructed and controlled that during a single cycle of operation of the machine the stops and detents are operated twice while the pusher is given two operations of different magnitude. The first operation of the pusher, following the release of the tripping mechanism provided, serves to force two stacks or groups of cans placed end for end into the box. In the machine illustrated this will mean the boxing of twenty-four cans stacked in two groups, end for end, of four rows of three cans each. For this purpose the pusher is given its full or long stroke. Subsequently after a new set of cans has been fed into the stacking chamber of the machine, the pusher is given its second or short stroke which serves merely to force the single stack of cans into the funnel. The parts are then restored to normal position so that a new stack of cans may be formed within the stacking portion of the machine and this new stack, together with the stack already in the funnel, will then be forced into another box at the beginning of the next operation.

Referring now to Figures 1 and 8, the means for operating the stops, detents and pushers comprises a large cam 54 having camming projections extending axially from its opposite faces. This cam is carried by a shaft 55 journalled in the side frames 10. The shaft 55 is in turn driven, through a suitable clutch connection, by a shaft 56, connected with an electric motor 57. The connection between the shafts 55 and 56 is made through suitable reduction gearing enclosed in a housing 58 and through a one-revolution clutch 59 of any suitable form, the construction being such that under the control of a foot pedal, the cam 54 may be given a single revolution at will. The foot pedal, not shown, is disposed conveniently beneath the funnel 53 where it may be tripped by the operator of the machine whenever he is ready to have the cans forced into a box. This pedal may be connected by a link 60 to any suitable mechanism for tripping the clutch to permit the shaft 55 to be driven through one revolution at the end of which it will be automatically stopped until the clutch is again tripped.

For the purpose of operating the stops 50, the cam 54 is provided with an axially extending camming projection 63 adapted to cooperate with a roller 64 carried by an arm 65 secured to a shaft 66 suitably mounted in a bracket 66a supported by the framework of the machine. A spring 63a serves to rock shaft 66 and the arm 65 to maintain the roller 64 in engagement with the surface of the cam. Also secured to the shaft 66 is an arm 67 which is connected by link 68 to a shaft 70 mounted in a bracket 71 carried by the framework of the machine. A pair of arms 72, also secured to the shaft 70, carries a rod 730 which forms a pivotal connection between the arms and a rearward extension 73 of each of the stops 50. The extensions 73 are also pivotally connected by means of a rod 74 to a pair of arms 75 pivotally supported by means of a shaft 76 carried by the bracket 71. The shafts 70 and 76, as well as the rods 73 and 74 by which the arms 72 and 75 are connected to the stops 50, may extend vertically to a sufficient extent to carry and operate all of the detents simultaneously. Due to the parallel link construction provided the stops 50 will be moved in such a way as to maintain their forward faces in a plane constantly parallel to that shown.

In order to provide for adjustment of the position of the stops to maintain cans of different diameters in proper relation to the pushers, the link 68 may be provided with a series of holes 77, three being shown, any one of which may be used in pivotally connecting the link by means of a bolt 78 to the arm 69. In this way the normal position of the stops may be varied to suit the requirements. As already indicated, the cam 63 is of such form as to cause the stops to be withdrawn twice during each operation of the machine at the appropriate time prior to the operation of the pushers.

For the purpose of operating the detents or dividers 51, a second axially extending cam formation 79 is provided on the element 54. This cam formation is adapted to cooperate with a roller 80 carried by an arm 81 secured to a shaft 82 mounted in the bracket 660. A spring 790 serves to rock the arm to maintain the roller 80 in constant engagement with the surface of the cam 79. Mounted on the shaft 82 and adapted to rotate therewith is a yoke 83 having an upwardly extending bar 84 of channel form. A similarly formed bar 85 is vertically disposed at the opposite side of the machine and is provided with a yoke 86 secured to a shaft 87. The two shafts 82 and 87 are adapted to be oscillated in unison but in opposite directions, angularly, by virtue of the interengagement of segments 88, one of which is secured to each of the shafts. Cooperating with the channels of the bars 84 and 85 are a series of rollers 89 carried by arms 90 pivotally mounted on pins or studs 91. The arms 90 are portions of bell crank levers having arms 92 which are adapted to support the opposite ends of the series of detent rods 51, as best shown in Figure 8. A bell crank 90, 92 is provided at each end of the detents 51.

It will be apparent that as the channel bars 84, 85 are shifted toward the right in Figures 6 and 9, the bell cranks will be rocked in unison in a clockwise direction to lower the detents into the path of the cans on the runways 13. This downward movement of the detents will take place twice during each cycle of the machine, due to the form of the cam 79, and it will be so timed as to occur substantially in unison but preferably slightly in advance of the withdrawal of the stops 50. When the detents are lowered the cans to the left of the same, as viewed in Figure 7, will be held against further movement along the runways and may even be cammed slightly up the runways. As the withdrawal of the stops 50 is then continued, a separation will be effected between the three cans in each row which are in line with the pushers and the remaining cans on the runways.

The means for operating the pushers comprises a cam formation 93 extending axially from the opposite side of the element 54 from the cam formations 63 and 79. A roller 94 carried by an arm 95 secured to a shaft 96 is held in contact with the surface of the cam formation 93 by means of a spring 97 which is attached at one end to a fixed portion of the machine and at its opposite end to an arm 98 secured to the shaft 96. At its free end the arm 95 is connected to a bolt or stud 99 with an arm 100 pivotally connected with a vertically extending shaft or rod 101. This shaft at its upper end is connected by a similar system of links to the shaft 96. For this purpose an arm 102 is secured to the shaft 96 and is connected by a stud or bolt to an arm 103 pivotally connected to the upper end of the shaft 101. As the arms 95 and 102 are rocked about the axis of the shaft 96, the shaft or rod 101 is drawn bodily toward the stacking chamber of the machine and in its movements is guided by means of suitable guide elements 104 arranged adjacent both the top and bottom of the shaft. At its upper end the shaft 101 may have secured thereto a shoe 1010 which has grooves along its side edges adapted to engage and slide along the edges of the guides 104. This arrangement will prevent turning of the shaft as it is shifted by the arms 100 and 102. A similar construction may be provided at the lower end of the shaft 101, if desired, or a roller or collar 1011 may be provided at this end to ride between the guides 104. Secured to the shaft or rod 101, as by means of split collars 105, are a series of yokes 106 which carry at their forward ends the pushers 52. The yokes 106 are suitably spaced along the rod 101 to place the pushers 52 in line with the cans to be forced into the funnel 53 and into the box. They may be adjusted to any desired elevation by unclamping the split collars. As previously mentioned, the cam 93 is adapted to give to the arm 95 and to the pushers both a long or complete stroke and a short or half stroke during each operation of the machine. For this purpose the cam surface is provided with a deep depression or dwell 931 and a shallow dwell 932 appropriately situated with relation to the normal position of the cam. The relation of the various cam surfaces on the cam 54 is such that at the beginning of an operation of the machine the detents 51 are lowered and the stops 50 are withdrawn. The pushers 52 are then given their long or full stroke to force two stacks or groups of cans into a box. The detents and stops remain in their lowered and withdrawn positions throughout the operation of the pushers. During the continued operation of the machine, after the pusher has been restored to its normal position the detents and stops are also restored and a new stack of cans is formed in the stacking chamber. Subsequently the stops 50 and detents 51 are again operated and the pushers 52 again shifted to force the newly formed group or stack of cans into the funnel 53 in readiness for the next operation of the machine. By timing the operation in this way the attendant may trip the clutch mechanism whenever he has a box in readiness to receive the cans from the funnel 53. While he is then preparing for the application of a new box to the funnel, the machine will continue its operation to store the first stack or group of cans in the funnel. In order to facilitate the operation of the machine by a single attendant suitable means, forming no part of the present improvements, may be provided for holding the boxes in position during the loading operation and for lowering or discharging them after they have been loaded. This leaves the operator free to attend to the preparation and application of the boxes to the funnel.

In order to adapt the machine to more readily handle cans of different diameters, provision is made for varying the positions of the ends of the runways 13 which are located in and adjacent the stacking chamber of the machine. It is desirable to reduce as far as possible the amount of separation between the cans in the various rows as they stand in the stacking chamber. Any separation between the rows at this point must be eliminated as the cans are forced into the funnel 53 by the dropping of the upper rows of cans and it is desirable to reduce this movement to a minimum. In the adjustment of the runways 13, provision is made for raising the lower runways at the same time that the upper runways are lowered as to bring about a convergence between the upper and lowermost runways. To effect the adjustment, each runway, as well as the upper guide above the top row of cans, is supported adjacent the detents 51 by means of a bracket 107 which is carried by a rod 108. Each of these brackets has an arm 109 which carries the pivot 91 for the bell cranks 90, 92. The intermediate one of the five brackets 107 is supported by the rod 108 at a fixed elevation but the runways and guide above and below the central runway are adjustable toward and away from the latter. For this purpose the rod is provided with a series of threads 110, 111, 112, and 113. The threads 110 and 111 may be righthand threads, for example, while the threads 112 and 113 are lefthand or of opposite sense to the upper threads. Furthermore, the threads 110 and 113 are double or are of greater pitch than the threads 111 and 112; therefore, as the shafts 108 are rotated, the threaded engagement between the various series of threads and the brackets 107 will cause the two uppermost brackets to move downwardly and the two lowermost brackets to move upwardly and vice versa, depending upon the direction of rotation of the shaft 108. Furthermore, the rate of advance toward or recession from the central runway for the uppermost and lowermost brackets will be double, or at least materially greater than that for the two brackets adjacent the central bracket. At its upper and lower ends the shaft 108 is suitably supported by bearings 114 and 115, respectively. It will be understood that a rod 108 and a series of brackets 107 will be provided on each side of the runways and adjustment of the two sides should be effected in unison to maintain the runways in proper planes. To insure uniform adjustment of the two shafts, they may be provided with sprocket wheels 116 connected by a chain 117, and either shaft may have a handwheel at its upper end or be adapted to receive a wrench. The funnel 53 may be supported in any suitable way by the framework of the machine and may be replaced by funnels of different sizes when different sized cans and boxes are used.

Referring now to the modifications shown in Figs. 12 to 18, inclusive, and particularly to Figs. 12 and 14, for certain classes of work where particularly rapid packing is desired, it is necessary to cause the cans to enter the stacking chamber more quickly when the detent, or gate mechanism, is opened. It will be understood that the cans on the storage runway are at rest when the gates are raised, and must be accelerated entirely by the comparatively gentle slope of the storage runways 13, as shown in Fig. 1. More especially when the cans are heavy, the time for acceleration and forward movement into the stacking chamber becomes appreciable.

Furthermore, although the cans will flow through the distributing mechanism 12 at a rate which is equal to or higher than the rate at which the cans can be placed in the packing cases by the stacking mechanism and plunger, if the cans were required to roll directly from the distributing mechanism or divider into the stacking chamber, the rate at which cans would be packed in the cases would be lowered. Consequently, in accordance with the modification, not only are the cans delivered more quickly into the stacking chamber upon the opening of the gate mechanism, but provision is made whereby, under no circumstances, will the rate of packing by the stacking mechanism and plunger be lowered, due to the passage of the cans through the distributing mechanism.

This increase in the speed of entry of the next succeeding charge, tier, or layer of cans from the storage runways into the stacking chamber cannot be accomplished merely by increasing the gradient, or steepness, of inclination of the storage runways extending between the stacking chamber and the distributing or dividing mechanism. This would cause the cans to roll at too great a speed along the storage runways so that they would hit against one another with such force that they would be liable to damage.

In addition, it would raise the intake elevation of the machine to too great a height, and furthermore the funnel would have to be set at such a steep angle that it would become awkward for the operator to put the cases onto the funnel, and it would be liable to interfere with the proper functioning of the carton drop-off mechanism, that is, the mechanism for lowering the filled carton from its horizontal position on the funnel to vertical position.

The primary object of the modified form of our invention is, therefore, to overcome the above difficulties and provide a packing machine which will have the advantages mentioned.

A further aim of the invention is to provide a can runway construction, particularly for the storage runways, whereby the cans will be compelled to roll along the same with their beads in alinement, thereby avoiding the possibility of having the bead of one can deface the label or varnish on the body of an adjacent can by rolling in contact therewith.

Another feature of the modification is to provide a funnel construction wherein the cans will be maintained in axial alinement with one another as they are pushed through the funnel into the carton. This overcomes the difficulty sometimes experienced, particularly with cans whose diameters are larger than their length, or where the machine operates at especially high speed, of having the cans fall over on their ends as they are being slid in the direction of their axes through the funnel.

A still further object of the modification is to provide a funnel construction which is adapted for ready removal and the substitution of a funnel of different size when the adjustment of the machine, as previously described, is changed, in order to accommodate cans of different diameters.

Another object of the modification is to provide for the change-over of the packing machine so as to enable it to pack either a single tier or layer of cans in a case, or a plurality of tiers, as may be desired.

The features of the modified form of our invention by means of which the foregoing advantages are secured, will be understood from the following description:

Referring first to Figs. 12 and 14, the can stacking chamber 14a and the can separating, or dividing, mechanism 12a are substantially identical with those previously described; also the can stops 52a and their operating mechanism, and the detents or gates and their actuating mechanism, which are indicated generally in Fig. 12 by reference numeral 51a; also the plungers 52a and their mounting, including arms 103a, 102a and 95a. In order to cause the next charge of cans to be quickly moved into the stacking chamber after the operation of the plunger to push a preceding tier toward or into the case, and the gate mechanism has again opened, the storage runways 13a corresponding to storage runways 13 of Fig. 1 are made steeper, but shorter, the gradient of these runways being sufficient to impart rapid acceleration to the cans when the gate mechanism is opened. The discharge ends of each of these runways connect with the shelves of the stacking chamber which are at the same comparatively gentle slope as in the case of Fig. 1, so that the angularity of the funnel and of the carton and its supporting mechanism is not increased.

The storage runways 13a are joined by storage extension runways 118 which connect runways 13 with the outlets of the distributor or dividing mechanism 12a which receive the cans from the single feed line runway 15a and distribute them equally between the runways 118. The slope of the storage extension runways 118 is approximately the same as that of the shelves in the can stacking chamber 14a.

In operation, when the gate mechanism 51a opens, the cans on the steep storage runways 13a move forward, pushing the cans ahead of them rapidly, due to the steepness of the slope. The several lines of cans separate at about the juncture between the runways 118 and runways 13a, leaving a gap at this point which is widened as the cans move forward into the stacking chamber to form the next tier or layer. The cans in storage extension runways 118 move forward and take up this gap after the motion of the cans on storage runways 13a has ceased. The impact of the cans when these gaps are closed, however, is not great, in spite of the large number and weight of the cans moving forward on storage runways 118, because the slope of these runways is chosen so as to prevent the cans from attaining high velocity during this movement.

In order to provide for an ample supply of cans to be admitted to the stacking chamber 14a under all possible conditions of operation so that the rate of packing of the machine will never be retarded by the relatively slow movement of the cans through the separating mechanism 12a, the storage capacity of extension runways 118 is at least equal to the storage capacity of runways 13a, and is preferably from one and one-half times to two times as great as these runways. Because of the greater length of the machine caused by this increased storage capacity, the right hand end of frame member 11a and the separating mechanism 12a are supported by means of a post 119 which extends upwardly from the floor to frame member 11a.

Should the storage runways 13a and 118 become completely filled with cans because of an interruption in the operation of the packing plungers 52a while the supply of cans in feed line 15a continues without interruption, the separating mechanism 12a will become choked with cans. It requires the attention of the operator of the machine to set the separating mechanism 12a again in proper operation. In order to avoid this, and at the same time enable the machine to take full advantage of the storage capacity of runways 13a and 118 in order to prevent a possible retardation of the rate of packing of the machine, the following mechanism is provided:

Referring to Figs. 12 and 14, a short section 120 of the lowermost runway 118 is pivoted at its lower end and provided with a counterbalancing weight 121 which is adjustable in its position on its supporting arm 122. The length of this runway is sufficient to hold a predetermined number of cans, say for example, 5 or 6, and the counterweight 121 is arranged to maintain the pivoted section 120 in its normal position until such a time as cans may collect on runways 13a and 118 up to the point where the predetermined number of cans rest upon pivoted section 120. Then the section is depressed slightly thereby closing the contacts of an electric switch 123 which, through conductors 124, closes a circuit through a solenoid 125. The lifting of the solenoid core shifts a horizontal bar 126 into the path of the cans entering the separating mechanism 12a and cutting off the delivery of cans thereto from feed line 15a. As soon as the cans move off from pivoted section 120, it is returned to its upper position by means of counterweight 21, opening switch contacts 123. This allows a spring 127 to withdraw the cut off bar 126 to its original position, thereby permitting the feeding of the cans to be resumed.

Figure 14 not only shows a diagram of the circuit connections between switch 123 and the cut-off operating solenoid 125, but also shows certain details of the mounting of the balanced track section 120 and the switch 123; and it also shows a transverse vertical section taken centrally through the upper part of distributing mechanism 12a and showing the details of construction of the cut-off mechanism. The operating solenoid 125 of the cut-off is carried upon a bracket structure 12b which is mounted upon the front side plate of the distributing mechanism. The solenoid core operates cut-off bar 126 through a ball crank lever 125' and a compression spring 126'. The motion of the bell crank lever is transmitted to cut-off bar 126 through this spring, the right hand end of which bears against the collar secured to the cut-off bar.

By this arrangement, if the solenoid happens to be energized at a moment when a can is passing the end of the cut-off bar, the bar being yieldingly actuated by means of spring 126' does not dent or otherwise injure the end of the can, and is thrown into cut-off position as soon as this can has passed the bar.

Adjustment of counterweight 121 is provided for not only to vary the number of cans required to operate the can cut-off mechanism, but also to permit of adjustment for different weights of cans when the machine is adjusted for cans of different diameter. On account of the law of operation of the separating mechanism 12a which distributes every fourth can to the lowermost row, under normal operation of the apparatus, successive cans passing over pivoted section 120 will be spaced a considerable distance apart so that usually not more than one can will rest upon the pivoted section at a given instant. Hence it is impossible under normal operation for section 120 to be depressed and stop the feeding of the cans.

In the machine of Fig. 1, runways 13 and the shelves within the can stacking chamber consist of metal plates to which are attached guide rails consisting of steel angle bars, shown in section in Fig. 8. Due to the lack of rigidity and the variations which occur in the manufacture of these bars, it is substantially impossible to mount them and keep them in accurate gauge, that is, in uniformly spaced relation throughout the length of the runways. The result is that as the cans roll along the runways the bead of one can will rub the body of the next can. This has a tendency to mar the label or the varnish finish of the can as the case may be.

In accordance with the modified construction of Figs. 12 and 13, however, the guide rails 128 and 129 are made of cold-rolled bars of substantially rectangular and massive cross section so that these bars are comparatively rigid and can readily be mounted upon their supporting plates 130 and maintained in accurate gauge throughout the length of both runways 118 and 13a, and the gauge may be so nearly equal to the length of the cans that the two beads of each can will be maintained in alinement with the beads of the adjacent cans and the marring of the can body is prevented. As shown in Fig. 13, and also in Fig. 15, guide rail 128 may be adjusted so as to change the gauge of the rails to accommodate cans of different lengths. This is accomplished by loosening holding screws 131 and shifting them in slots 132.

In Figs. 15 and 16, the details of the funnel construction are illustrated. The bottom 133 and left hand side 134 of the funnel, as viewed in Fig. 12, consist of a single L-shaped piece of heavy gauge sheet metal and are relatively rigid. The bottom may slope upwardly, as in Figs. 15 and 12, or it may be arranged horizontally, depending upon the type of can which the machine is to handle. The top of the funnel is yieldable for a purpose which will presently appear, and for convenience is constructed of three spring steel plates 135 which normally are biased downwardly at a considerable angle, as indicated at Fig. 15. The right hand side of the funnel 136, while somewhat yielding, need not yield to a great extent. It will be understood that the carton or case to be filled with cans is held in horizontal position by the drop off mechanism 137 with its mouth telescoped over the funnel. The left hand flap of the carton engages a stop 138 and the right hand carton flap is deflected by means of a guide 139 to prevent it from becoming entangled with the gate operating mechanism 51a.

As the rows of cans are held in the stacking chamber on the several supporting shelves 140, each row is spaced vertically from the next row and as the cans are slid forward into the funnel by the pushers 52a, the second row is lowered into contact with the lowermost row, the third row with the second and the fourth row with the third. To accomplish this and prevent liability of the cans being upset due either to high speed of operation, or to the fact that the cans are larger in diameter than their height, each of the shelves 140 is provided with downwardly yielding flights or extensions 141 which project from the side edges of the shelves 140 into the funnel member. These flights 141 are preferably made of highly flexible resilient spring steel sheets.

The resilient and yielding upper members 135 of the funnel contact with the uppermost row of cans as they move over the uppermost yielding flight 141 and deflect this row into contact with the next, thereby holding all of the rows in contact with each other and preventing any of the cans from becoming upset. In addition, in order to keep the cans of each horizontal row in contact with one another, especially when they are packed empty, flexible steel tongue members 142 are mounted, one opposite each row at the right hand side of the funnel. These flexible resilient tongues deflect the respective rows of cans into contact with the left hand side 134 of the funnel. By means of this funnel construction, the cans enter the carton as a compact mass which properly fits the particular size of carton which is employed.

In order to provide for the ready removal of one size funnel and its replacement by a funnel of different size, a vertical bar 143 is secured by means of bolts 144 to the upper frame member 145 of the machine. This bar on its rear surface is provided with a series of spaced metal buttons 146, the shanks of which are anchored in the bar and the heads of which are spaced slightly from the rear surface of the bar.

The funnel is provided along its right hand vertical feed with a flange 147, the edge of which is slotted opposite each button 146, as indicated by reference numeral 148 in Fig. 16 and also as shown in dotted lines in Fig. 12.

At the left hand side of the funnel there is a vertical bar 149 similar to bar 143, but permanently attached to the funnel itself instead of to the frame of the machine. The upper and lower ends of this bar 149 are removably secured respectively to the frame members 145 and 11a by means of bolts 150.

In order to remove the funnel from the machine, it is only necessary to remove the four bolts 150, all of which are on the left hand side of the funnel near the end of the machine where they are readily accessible, and then slide the funnel bodily to the left, as viewed in Fig. 12, thereby freeing the slots 148 of flange 147 from the buttons 146. A funnel of different size, but having a similarly slotted flange 147 and a similar bar 149 may then be placed upon the machine by reversing the operation just described.

By means of the mechanism illustrated in Figs. 17 and 18, we have provided in the modified form of our invention for the changing of the stroke of the plunger or pushers 52 and the actuation of the can stops 50 and the gates or detents 51a, so as to provide for operating the machine to pack either a single tier or layer or a plurality of layers at each cycle of operation of the machine. In these figures, we have shown mechanism for changing over a machine from two-tier packing to single-tier packing, or vice versa. That is to say, the plunger may be made to operate with one short stroke and one long stroke for each revolution of the operating cam, or with only a single long stroke for each revolution of this cam.

For this purpose, the motor 57a is connected with shaft 56a of the speed reducing gear 58a by means of a change-speed drive which, in the example illustrated, consists of a pair of stepped pulleys 151 and 152 together with a driving belt 153.

In considering Fig. 17, it will be helpful to also consider Fig. 9, as the latter figure shows parts of the machine which have been omitted from Fig. 17 for the sake of clearness. The operating cam 54a is provided with a slotted cam track 93a which engages roller 94a on arm 95a which is the actuating arm for the pushers 52a. This cam track, as may be seen from Fig. 18, is provided with a high crest formation which imparts the long stroke to the pushers 52a, and a low crest formation 155 which imparts the short stroke to the pushers. When it is desired to eliminate the short stroke so that the pushers will make only a single long stroke during each revolution of the cam, crest formation 155, which is secured to the body of cam 54a by means of screws 156, is removed, leaving a straight cam formation 157 which constitutes a continuation of the dwell 158 of the cam.

When the short stroke is eliminated, it is also necessary to prevent the operation of the gate mechanism and desirable to avoid operating the can stop mechanism. The operation of these two mechanisms is controlled by means of cam formations 79a and 63a, respectively. Roller 80a carried by arm 81a actuates the gate mechanism 51a, and roller 64a carried by arm 65a actuates the can stop mechanism. Arm 65a is secured to shaft 66a to which a shorter arm 67a is also fixed, this arm being connected by means of a link 68a to the cam stop mechanism.

Operating cam 54a is provided with a second removable section 159 which is removably attached to the cam by means of screws as indicated in Fig. 18. The removal of section 159 changes the configuration of both cam formation 79a and 63a by creating a valley 160 in cam formation 79a and a valley 161 in cam formation 63a, both of which are opposite the removable crest section 155 of cam track 93a.

When it is desired to eliminate the short stroke of the pushers from the operation of the machine, crest section 155 is removed, and removable section 159 is inserted, thereby eliminating the valleys 160 and 161 and preventing the second operation of the gate and can stop mechanism. At the same time the belt 153 is shifted so as to increase the speed of rotation of the operating cam 54a. This enables the packing machine to pack cases containing only a single tier of cans at the same rate as when operating to pack cases containing a plurality of tiers of cans. That is to say, the machine packs the same number of cans per mimnute whether the cans are packed one layer to a case, or two or more layers to the case, thus enabling the packing machine to perform its work without interfering with the speed of operation of the can labelling machine or can processing equipment with which it may be connected to receive cans.

The processing equipment and the can labelling machine have a definite speed of operation, that is to say, they deliver cans at a predetermined number per minute and it is desirable to maintain this rate whether the cans are being packed one layer to a case or several layers to a case. Where the cases are packed only one layer or tier to the case, it is necessary to make the pushers 52a of the packing machine operate twice as fast as when the machine is packing two layers to a case, or three times the speed as when the machine is packing three layers to the case. This increase in speed is necessary because the operating cam 54a makes one revolution for each case packed, regardless of whether several layers are being packed in the case or only a single layer.

Although we have illustrated an operating cam having cam formations which are adapted to impart only one short and one long stroke to the pusher, it will be understood that when packing additional layers in a case, for example, three, the operating cam will be provided with two removable crests 155 and two removable sections 159, instead of one of each, as illustrated in the drawings.

The intended mode of operation of the machine has been sufficiently fully set forth in connection with the detailed description of the various portions of the same so that a general résumé of operation is believed to be unnecessary. While illustrative forms of the invention have been set forth in considerable detail, it is to be understood that various changes and modifications may be made in the construction of the parts and the arrangement disclosed without departing from the general spirit and scope of the invention as defined by the claims.

This application is in part a continuation of the applicants' copending application Serial No. 505,282, filed December 29, 1930 (owned by the same assignee as the present application) which issued on August 25, 1936 as Patent 2,052,513.

We claim:
1. A machine of the class described comprising the combination of a packing mechanism including means for stacking cans in a plurality of superposed rows to form a charge and ejecting mechanism for discharging the charge into a case, the stacking mechanism being adjustable for cans of different diameter, and mechanism for receiving cans from a single line and distributing them to the superposed rows of the stacking means comprising a casing having an opening for the reception of cans delivered to said machine and a plurality of channels below said opening and connected respectively to the superposed rows of the packing mechanism, means centrally disposed beneath said opening for directing successive cans passed through said opening into a different one of said channels, and means for varying the size of said opening to accommodate cans of different diameter while maintaining the centralized relation between said opening and said can directing means.

2. In a machine of the class described a can stacking chamber, means for delivering cans in rows to said chamber, and movable stop mechanism at the end of said chamber for arresting the cans delivered thereto comprising a pair of spaced parallel rods opposite the ends of said rows, a stop member for each row movable substantially in line therewith, each of said members having a can-stopping face extending transversely thereof at its inner side and a supporting arm extending from its outer side and pivoted to both of said rods, and means for supporting said spaced parallel rods including an arm pivoted to each of said rods, said arms being mounted for oscillation about centers opposite the ends of said rows and spaced apart a distance equal to the spacing of said rods whereby when said stop members are moved the can-stopping faces thereof will maintain their transverse position at right angles to the direction of advance of the cans in said rows.

3. In a machine of the class described a can stacking chamber, means for delivering cans in rows to said chamber, a plunger for ejecting cans from said chamber into a packing case, movable stop mechanism at the end of said chamber for arresting the cans delivered thereto comprising a pair of spaced parallel rods extending vertically opposite the ends of said rows, the axes of said rods lying in a vertical plane perpendicular to said rows, a stop member for each row movable substantially in line therewith having a face extending transversely thereof at its inner side, each of said members having a supporting arm extending substantially at right angles from its outer face and pivoted to both of said rods, and means for supporting said spaced parallel rods including an arm pivoted to each of said rods, said arms being mounted for oscillation about centers opposite the ends of said rows and spaced apart a distance equal to the vertical spacing of said rods whereby when said stop members are moved the can-stopping faces thereof will maintain their transverse position at right angles to the direction of advance of the cans in said rows, and means for shifting said stop members comprising a link adapted to be moved longitudinally in timed relation to said plunger, and means for operatively connecting said link to one of said arms.

4. In a machine of the class described a can stacking chamber having a plurality of shelves arranged therein one above the other for receiving each a row of cans to form a tier or layer to be ejected therefrom into a case, inclined superposed storage runways for delivering cans to said shelves, gate mechanism for admitting cans from the runways to the can stacking chamber, said storage runways having two sections differing in slope, the section having the greater slope being adjacent the gate mechanism whereby upon the opening of said gate mechanism the cans on said storage runways to form the next tier move quickly into the stacking chamber.

5. In a machine of the class described packing mechanism including a can stacking chamber having a plurality of shelves arranged therein one above the other for receiving each a row of cans to form a tier or layer to be ejected therefrom into a case, means for ejecting the cans, inclined superposed storage runways for delivering cans to said shelves, and gate mechanism for admitting cans from the runways to the can stacking chamber, said storage runways having a steeply inclined section adjacent the gate mechanism of a sufficient length to hold a charge of cans whereby upon the opening of said gate mechanism, the cans on said storage runways to form the next tier move quickly into the stacking chamber, storage extension runways connected to said steeply inclined runways, and a distributing mechanism for receiving cans from a can feed line and distributing them to said storage extension, the rate of passage of cans through said distributing mechanism being lower than the rate at which cans are packed in a single carton by said packing mechanism and the storage capacity of said storage extension being sufficient to prevent the rate of packing from being retarded by the operation of said distributing mechanism.

6. In a machine of the class described a can stacking chamber having a plurality of shelves arranged therein one above the other for receiving each a row of cans to form a tier or layer to be ejected therefrom into a case, inclined superposed runways for delivering cans to said shelves, gate mechanism for admitting cans from the runways to the can stacking chamber, said runways having a short section adjacent said gates which is adapted to hold a full tier of cans and which is steeply inclined so as to cause the cans thereon to roll into the stacking chamber promptly upon the opening of the gate mechanism, a storage extension having a more gentle slope whose length is at least equal to that of the steep section, and a distributing mechanism for receiving cans from a can feed line and distributing them to said extension.

7. In a machine of the class described a can stacking chamber having a plurality of shelves arranged therein one above the other for receiving each a row of cans to form a tier or layer, means for ejecting said cans into a case, inclined superposed runways for delivering cans to said shelves, gate mechanism for admitting cans from the runways to said shelves, said runways being steeply inclined so as to cause the cans thereon to be moved quickly into the can stacking chamber upon the opening of said gate mechanism, storage extension runways connected to said steeply inclined runways, and a distributing mechanism for receiving cans from a can feed line including movable can-deflecting means movable to different positions to distribute cans passing therethrough to different ones of said extension runways, a cut-off for stopping the flow of cans to said distributing mechanism, and mechanism associated with one of said storage extension runways for actuating said cut-off to prevent cans on said runways from backing up into the distributing mechanism.

8. In a machine of the class described a can stacking chamber having a plurality of vertically spaced shelves, means for delivering a row of cans to each shelf to form a tier or layer for a carton, a funnel-shaped member disposed adjacent said chamber, means for supporting a case with its mouth telescoped upon the smaller end of the funnel-shaped member, means for ejecting a tier or layer of cans from the stacking chamber through the funnel-shaped member into the case, yielding means arranged within said funnel member for holding the cans of each horizontal row in contact with one another, and yielding means forming a part of the funnel member for holding the superposed cans of the several layers in contact with one another as they pass through said funnel into the carton.

9. In a machine of the class described a can stacking chamber having a plurality of vertically spaced shelves, means for delivering a row of cans to each shelf to form a tier or layer for a carton, a funnel-shaped member disposed adjacent said chamber, means for supporting a case with its mouth telescoped upon the smaller end of the funnel-shaped member, means for ejecting a tier or layer of cans from the stacking chamber through the funnel-shaped member into the case, plate spring means arranged within said funnel member for holding the cans of each horizontal row in contact with one another, and yielding means forming a part of the funnel member for holding the superposed cans of the several layers in contact with one another as they pass through said funnel into the carton.

10. In a machine of the class described a can stacking chamber having a plurality of vertically spaced shelves, means for delivering a row of cans to each shelf to form a tier or layer for a carton, a funnel-shaped member disposed adjacent said chamber, means for supporting a case with its mouth telescoped upon the smaller end of the funnel-shaped member, means for ejecting a tier or layer of cans from the stacking chamber through the funnel-shaped member into the case, a flexible resilient tongue mounted to engage one end of each row of cans and cooperate with the opposite wall of the funnel-shaped member to maintain the cans of each horizontal row in contact with one another, and yielding means forming a part of said funnel-shaped member for holding the superposed cans of the several layers in contact with one another as they pass through the funnel into the case.

11. In a machine of the class described a can stacking chamber having a plurality of vertically spaced shelves, means for delivering a row of cans to each shelf to form a tier or layer for a carton, a funnel-shaped member disposed adjacent said chamber, means for supporting a case with its mouth telescoped upon the smaller end of the funnel-shaped member, means for ejecting a tier or layer of cans from the stacking chamber through the funnel-shaped member into the case, the funnel-shaped member having downwardly yielding flights therein whereby the cans on the said shelves are lowered into contact with one another in passing through the funnel, yielding means arranged within said funnel to engage and maintain the cans in each of the respective horizontal rows in contact with one another as they move over said downwardly yielding flights, and yielding means forming a part of said funnel for holding the superposed cans of the several layers in contact with one another as they pass from said flights into the carton.

12. In a machine of the class described a can stacking chamber having a plurality of vertically spaced shelves, means for delivering a row of cans to each shelf to form a tier or layer for a carton, a funnel-shaped member disposed adjacent said chamber, means for supporting a case with its mouth telescoped upon the smaller end of the funnel-shaped member, means for ejecting a tier or layer of cans from the stacking chamber through the funnel-shaped member into the case, the funnel-shaped member having downwardly yielding flights therein whereby the cans on the said shelves are lowered into contact with one another in passing through the funnel, a flexible resilient tongue mounted to engage one end of each row of cans and cooperate with the opposite wall of the funnel-shaped member to maintain the cans of each horizontal row in contact with one another as they move over said downwardly yielding flights, and yielding means forming a part of said funnel-shaped member for holding the superposed cans of the several layers in contact with one another as the cans pass from said flights into the carton.

13. In a machine of the class described means for stacking cans in a plurality of rows arranged one above the other, means for shifting said cans in the direction of their axes, and an operating mechanism for said machine adapted to impart a plurality of operations to said shifting means during a single cycle of operation, said operating mechanism comprising a cam member having a changeable cam surface whereby the number of operations of said shifting means during a single cycle of operation may be altered, constant speed power means for operating said machine, and a change-speed drive for operatively connecting said power means and said cam member for varying the speed of said cam inversely to the number of operations imparted thereby to the shifting means during a single cycle, so as to maintain constant the number of cans shifted by the shifting means in a given period of time regardless of the number of shifting operations occurring during a cycle.

14. In a machine of the class described means for stacking cans in a plurality of rows arranged one above the other, means for shifting said cans in the direction of their axes, and operating mechanism for said machine adapted to operate said shifting means twice and to different extents during a single cycle of operation, said operating means comprising a cam member having a changeable cam surface whereby the operation of the machine can be altered to operate said shifting means only once during a single cycle of operation, constant speed power means for operating said machine, and a change-speed drive for operatively connecting said power means and said cam member for varying the speed of said cam inversely to the number of operations imparted thereby to the shifting means during a single cycle, so as to maintain constant the number of cans shifted by the shifting means in a given period of time regardless of the number of shifting operations occurring during a cycle.

15. In a machine of the class described a can stacking chamber for stacking cans in a plurality of rows arranged one above the other, can storage runways arranged to supply cans to the respective rows of said stacking chamber, gate mechanism for admitting cans from the runways into the stacking chamber, means for shifting the cans in the stacking chamber in the direction of their axes, and operating mechanism for said machine adapted to impart a plurality of operations to said shifting means and gate mechanism during a single cycle of operation of the machine, said operating mechanism comprising a cam member having formations thereon for operating said shifting means and said gate mechanism, said cam formations being changeable whereby the number of operations of said shifting means and of said gate mechanism during a single cycle of operation may be altered, constant speed power means for operating said machine, and a change-speed drive for operatively connecting said power means and said cam member for varying the speed of said cam inversely to the number of operations imparted thereby to the shifting means during a single cycle, so as to maintain constant the number of cans shifted by the shifting means in a given period of time regardless of the number of shifting operations occurring during a cycle.

16. In a machine of the class described, a can-stacking chamber in which cans are stacked in a plurality of superimposed rows, reciprocating means for ejecting said rows of cans from the can-stacking chamber in the direction of their axes, and operating mechanism for said ejecting means including a cam having a portion of its surface shaped to impart a stroke of fixed length to the reciprocating ejecting means, another portion of said cam surface being changeable to a contour such that a stroke of different length may be imparted to said ejecting mechanism.

17. In a machine of the class described, a can stacking chamber having a plurality of shelves arranged therein one above the other for receiving each a row of cans to form a tier or layer, means for ejecting said cans into a case, inclined superposed runways for delivering cans to said shelves, gate mechanism for admitting cans from the runways to said shelves, and a distributing mechanism for receiving cans from a can feed line including movable can-deflecting means movable to different positions to distribute cans passing therethrough to different ones of said superposed runways, a cut-off for stopping the flow of cans to said distributing mechanism, and mechanism associated with one of said superposed runways for actuating said cut-off to prevent cans on said runways from backing up into the distributing mechanism.

18. A machine of the class described comprising a stacking chamber for receiving cans in a plurality of superposed rows, means for ejecting cans from said stacking chamber, superposed inclined runways for delivering cans to said stacking chamber at different levels, a main feeding means for cans having its discharge positioned at a level above the level of the topmost of said superposed inclined runways, and a can distributor interposed between said main feeding means and said superposed inclined runways having means operating during the passage of the cans by gravity from the elevated main feeding means to said superposed runways to deliver the cans during normal operation of the machine equally to each of said superposed runways, the delivery of cans to said superposed runways being independent of the number of cans in said superposed runways.

19. A machine of the class described comprising a stacking chamber for receiving cans in a plurality of superposed rows, means for ejecting cans from said stacking chamber, superposed, inclined runways or tracks for delivering cans to said stacking chamber at different levels, a main feed line for cans having its discharge end positioned at a level above the level of the topmost of said superposed, inclined runways or tracks, and a can distributor interposed between said main feed line and said superposed, inclined runways or tracks having means operated by the gravitational force exerted by cans passing from the elevated main feed line to said superposed, inclined runways or tracks for delivering the cans cyclically to each of said superposed, inclined runways or tracks one at a time.

WALLACE D. KIMBALL.
CORNELIUS I. BRAREN.
GEORGE P. SCHAEFER.